(12) United States Patent
Yamagata

(10) Patent No.: US 8,202,662 B2
(45) Date of Patent: Jun. 19, 2012

(54) FUEL CELL, MEMBRANE ELECTRODE ASSEMBLY AND MANUFACTURING METHOD THEREOF

(75) Inventor: Shinichiro Yamagata, Tokyo (JP)

(73) Assignee: Toppan Printing Co., Ltd. (JP)

( * ) Notice: Subject to any disclaimer, the term of this patent is extended or adjusted under 35 U.S.C. 154(b) by 768 days.

(21) Appl. No.: 12/404,215

(22) Filed: Mar. 13, 2009

(65) Prior Publication Data

US 2009/0239117 A1 Sep. 24, 2009

(30) Foreign Application Priority Data

Mar. 18, 2008 (JP) ................................ 2008-069005

(51) Int. Cl.
*H01M 8/10* (2006.01)
*H01M 8/00* (2006.01)
*H01M 4/02* (2006.01)
(52) U.S. Cl. ........ 429/483; 429/492; 429/480; 429/523; 429/535
(58) Field of Classification Search ................... 429/483, 429/492, 480, 523, 535
See application file for complete search history.

(56) References Cited

U.S. PATENT DOCUMENTS

2002/0182478 A1* 12/2002 Uchida et al. .................... 429/44
2006/0229194 A1* 10/2006 Uchida et al. ................. 502/101

FOREIGN PATENT DOCUMENTS

JP 2002-063909 2/2002

* cited by examiner

*Primary Examiner* — Helen O Conley
(74) *Attorney, Agent, or Firm* — Squire Sanders (US) LLP

(57) ABSTRACT

This invention provides a membrane electrode assembly having sufficient water retention ability and a high level of battery performance even under a low humidification condition. This invention discloses a manufacturing method of a membrane electrode assembly which has catalytic layers on both surfaces of a polymer electrolyte membrane. This manufacturing method includes following processes: A coating process that a catalyst ink which contains catalyst loading particles, a polymer electrolyte and a solvent is coated on a single surface of each of two base substrates. An arranging process in which a polymer electrolyte membrane is arranged between the two base substrates in a way that each of the base substrate's surfaces on which the catalyst ink is coated faces the polymer electrolyte membrane. A transferring process in which the catalyst ink coated on the two base substrates is transferred to both surfaces of the polymer electrolyte membrane to form the catalytic layers. A peeling process in which the two base substrates, which are attached to both sides of the polymer electrolyte membrane via the catalytic layers, are peeled off from the polymer electrolyte membrane and the catalytic layers. In addition, this manufacturing method has the following features: Each surface roughness (SRa) of the catalytic layers formed on the polymer electrolyte membrane after the peeling process is in the 0.01-1.00 μm range. Each gloss value at 85° (cf. JIS (Japanese Industrial Standard) Z 8741) of a surface of said catalytic layers is in the 10-80% range.

19 Claims, 4 Drawing Sheets

FUEL CELL, MEMBRANE ELECTRODE ASSEMBLY AND MANUFACTURING METHOD THEREOF

CROSS REFERENCE TO RELATED APPLICATION

This application is based on and claims the benefit of priority from the Japanese Patent Application number 2008-069005, filed on Mar. 18, 2008; the entire contents of which are incorporated herein by reference.

BACKGROUND OF THE INVENTION

1. Field of the Invention

This invention relates to a fuel cell for an automobile, house use or a mobile device, and a membrane electrode assembly (MEA) of the fuel cell.

2. Description of the Related Art

Fuel cells are attracting attention as a power supply system that hardly harms environment because water is the only by-product. In recent years, among various fuel cells, polymer electrolyte fuel cells (PEFCs) utilizing an ion exchange membrane, which has a proton conductivity, as an electrolyte membrane are considered promising as a power supply system for an automobile, house use and a mobile device because of a low operating temperature, high output density and ease of miniaturization.

Polymer electrolyte fuel cells can operate in a low temperature region. They are usually used at an operating temperature in the range of 80-100° C. and expected to be used as a power supply for an automobile or house use etc. A polymer electrolyte fuel cell (PEFC) is a battery having an assembled structure named membrane electrode assembly (MEA), in which a pair of catalyst electrode layers are arranged on both surfaces of a polymer electrolyte membrane, combined between a pair of separator plates, in one of which a flow path transferring a fuel gas such as hydrogen is formed and in the other of which a flow path supplying an oxidant gas such as oxygen is formed.

<Patent Document 1> JP-A-2002-063909

An MEA of a polymer electrolyte fuel cell needs to be humidified in order to maintain conductivity of the electrolyte membrane. It is desirable however that the fuel cell is operated with low humidification, or further, without humidification since the overall cost of the fuel cell system will increase because of the presence of a humidifier.

SUMMARY OF THE INVENTION

In order to obtain a high battery performance under a low humidification condition, it is necessary for the catalytic layer in the MEA to be hard to dry keeping moisture even under a low humidification condition. The present invention provides a polymer electrolyte fuel cell and MEA thereof which maintains a high battery performance and water retention characteristics even in a low humidification environment.

To provide such a fuel cell and an MEA, one aspect of the present invention includes a manufacturing method of an MEA which has catalytic layers on both surfaces of a polymer electrolyte membrane having specific features as follows. This method includes a coating process for coating a catalyst ink which contains catalyst loading particles, a polymer electrolyte and a solvent is coated on a single surface of each of two base substrates; an arranging process in which a polymer electrolyte membrane is arranged between the two base substrates in such a way that each of the base substrate's surfaces on which the catalyst ink is coated faces the polymer electrolyte membrane; a transferring process for transferring the catalyst ink coated on the two base substrates to both surfaces of the polymer electrolyte membrane to form the catalytic layers; and a peeling process for pealing off the two base substrates, which are attached to both sides of the polymer electrolyte membrane via the catalytic layers, from the polymer electrolyte membrane and the catalytic layers. And in this method, each surface roughness (SRa) of the catalytic layers formed on the polymer electrolyte membrane after the peeling process is in the 0.01-1.00 µm range, and each gloss value at 85° (cf. JIS (Japanese Industrial Standard) Z 8741) of a surface of the catalytic layers is in the 10-80% range.

In addition, another aspect of the present invention may include a manufacturing method of an MEA, wherein the catalyst ink is prepared receiving a dispersion treatment using a planetary ball mill.

In addition, another aspect of the present invention may include a manufacturing method of an MEA in accordance with claim 1, wherein the catalyst ink coated on the base substrates is transferred to both surfaces of the polymer electrolyte membrane with a transfer pressure in the 20-200 kgf/cm$^2$ range.

In addition, another aspect of the present invention may include a manufacturing method of an MEA, wherein the catalyst ink coated on the base substrates is transferred to the both surfaces of the polymer electrolyte membrane at a transfer temperature in the 120-150° C.

In addition, another aspect of the present invention may include a manufacturing method of an MEA, wherein the surface roughness of the catalytic layer on the polymer electrolyte after the base substrates peel off (SRa) is in the 0.05-0.40 µm range, and the gloss value at 85° (cf. JIS (Japanese Industrial Standard) Z 8741) of the catalytic layer surface is in the 50-80% range.

In addition, the present invention may include an MEA which is produced by the manufacturing method stated above.

In addition, another aspect of the present invention may include an MEA having specific features as follows. The MEA has a pair of catalytic layers and a polymer electrolyte membrane. The polymer electrolyte membrane is arranged between the pair of catalytic layers. The catalytic layers includes catalyst loading particles and a polymer electrolyte. The surface roughness of the catalytic layers (SRa) is in the 0.01-1.00 µm range, and the gloss value at 85° (cf. JIS (Japanese Industrial Standard) Z 8741) of a surface of the catalytic layers is in the 10-80% range.

In addition, another aspect of the present invention may include an MEA in accordance with claim 11, wherein the surface roughness of the catalytic layer on the polymer electrolyte after the base substrates peel off (SRa) is in the 0.05-0.40 µm range, and the gloss value at 85° (cf. JIS (Japanese Industrial Standard) Z 8741) of the catalytic layer surface is in the 50-80% range.

In addition, another aspect of the present invention may include a fuel cell which has a pair of separators, a pair of gas diffusion layers and the MEA in accordance with claim 6, wherein the MEA is arranged between the pair of gas diffusion layers, and the pair of gas diffusion layers combined together with the MEA are arranged between the pair of separators.

It is possible to obtain a polymer electrolyte fuel cell and an MEA thereof which has high battery performance and a catalytic layer that keeps sufficient water retention capability even under a low level of humidified (or not humidified) condition in accordance with the present invention.

DESCRIPTION OF REFERENCE NUMERALS AND SIGNS

1: MEA (Membrane electrode assembly)
11: Polymer electrolyte membrane
12: Catalytic layer (of cathode)
13: Catalytic layer (of anode)
A: Catalyst ink
12': Catalyst ink (before transfer)
13': Catalyst ink (before transfer)
14: Gas diffusion layer (of cathode)
15: Gas diffusion layer (of anode)
16: Cathode electrode
17: Anode electrode
18: Separator (of cathode)
19: Separator (of anode)
21: Base substrate

DETAILED DESCRIPTION OF THE INVENTION

The MEA of the present invention is described below.

Figure 1:
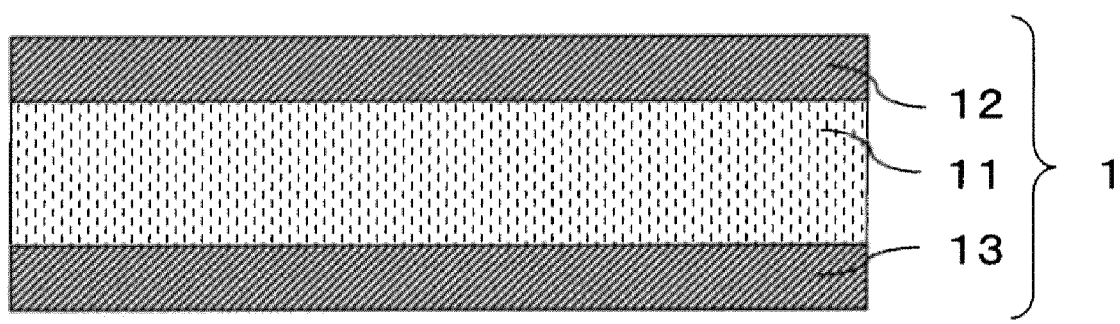
FIG. 1 is a cross sectional exemplary diagram of an MEA of the present invention.
Figure 2A:
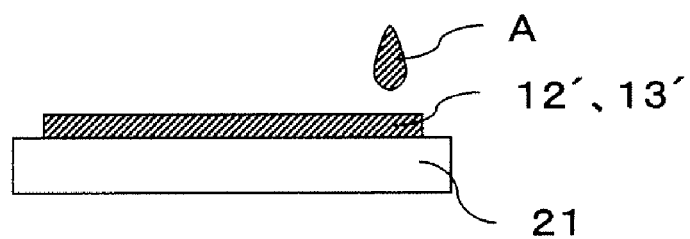
FIG. 2 is a cross sectional exemplary diagram illustrating a manufacturing method of an MEA of the present invention.
Figure 2B:
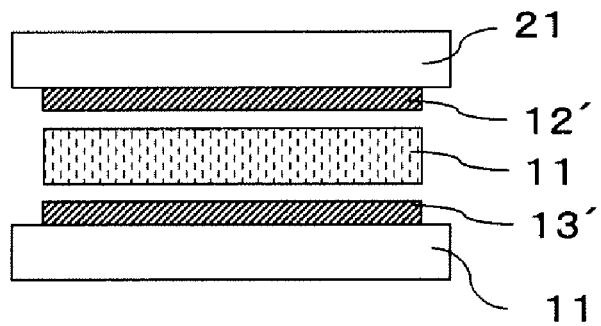
Figure 2C:
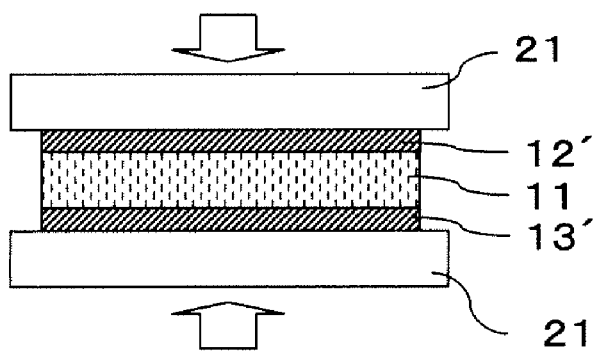
Figure 2D:
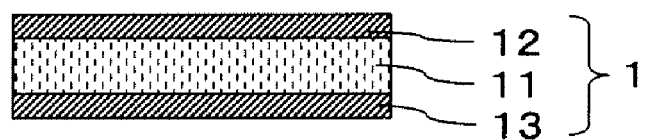

FIG. 1 shows an exemplary cross-sectional diagram of an MEA of the present invention. The MEA (1) of the present invention has catalytic layers (12,13) on both surfaces of a polymer electrolyte membrane (11).

FIG. 2 shows an exemplary cross-sectional diagram illustrating a manufacturing method of an MEA of the present invention. The MEA of this invention is manufactured by process 1 to process 4 described below.

<Process 1 (FIG. 2A)>

This is a process of coating a catalyst ink "A" which contains catalyst loading particles, a polymer electrolyte and a solvent on a surface of a base substrate (21).

<Process 2 (FIG. 2B)>

This is a process of arranging a polymer electrolyte membrane (11) between a pair of base substrates (21) in such a way that a catalyst ink (12', 13') which was coated on each of base substrates faces the surfaces of the polymer electrolyte membrane.

<Process 3 (FIG. 2C)>

This is a process of transferring catalyst inks (12', 13') coated on base substrates (21) to both surfaces of the polymer electrolyte membrane (11).

<Process 4 (FIG. 2D)>

This is a process of peeling off base substrates (21), and assembling an MEA which has catalytic layers (12, 13) on both sides of the polymer electrolyte membrane (11).

It is a feature of the present invention that a surface roughness of electrode layers (12, 13) of the MEA is in the 0.01-1.00 μm range, and a gloss value at 85° (cf. JIS (Japanese Industrial Standard) Z 8741) of the catalytic layer surface is in the 10-80% range. The inventor found that a polymer electrolyte fuel cell will have a high level of battery performance even in an environment of low humidification as long as these two parameters are in an appropriate region.

It is a feature of the present invention that a surface roughness of catalytic layers (SRa) of the MEA is in the 0.01-1.00 μm range. If the surface roughness of catalytic layers (SRa) is more than 1.00 μm, the battery performance falls since catalyst loading particles do not disperse satisfactory. In addition, contact resistance between the catalytic layer and its adjacent gas diffusion layer also causes a decrease of the battery performance. Meanwhile, if the surface roughness of catalytic layers (SRa) is less than 0.01 μm, a decrease of gas diffusion and water diffusion during power generation will make the battery performance worse. To be more precise, it is more preferable that the surface roughness of the catalytic layer is in the 0.05-0.40 μm range.

Figure 3:
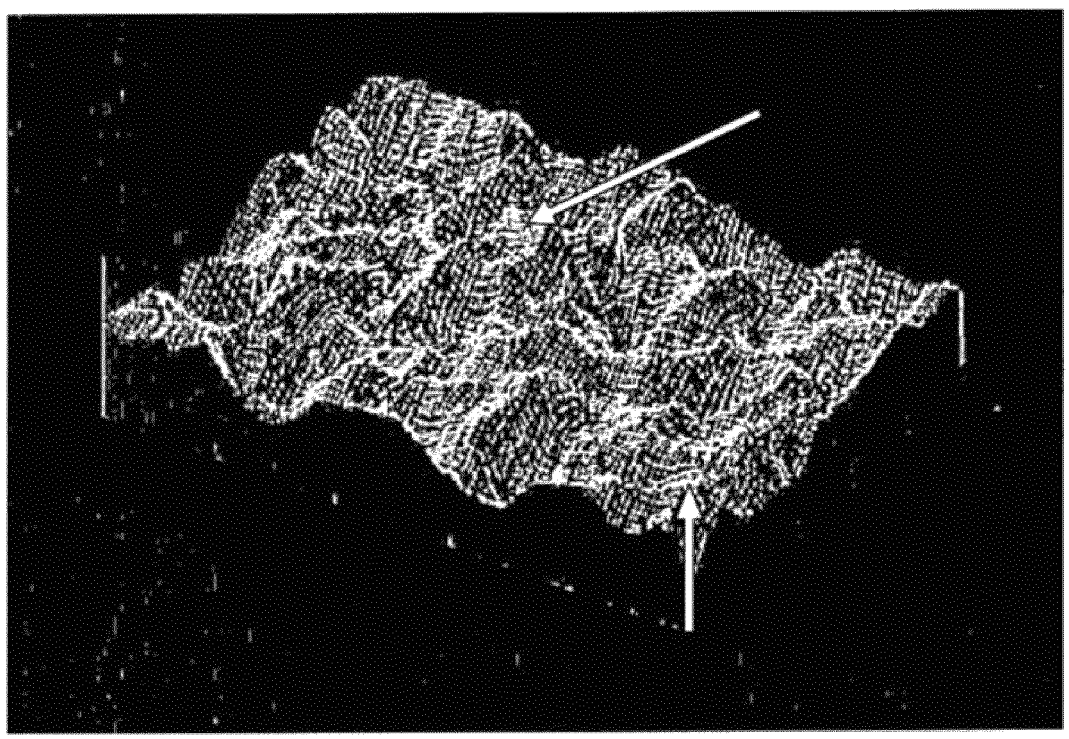
FIG. 3 shows an example of a roughness profile of a catalytic layer obtained with a LASER microscope.

The surface roughness of catalytic layers (SRa) of the MEA can be calculated from a roughness profile obtained by a LASER microscope according to the following formula (1).

$$SRa = (1/LM) \iint f(x,y) dx dy \quad \text{Formula (1)}$$

where L is a length along the x-axis, M is a length along the y-axis, and $z=f(x,y)$ is a height of a roughness profile as is shown in FIG. 3. Hence, an area mean height of a roughness profile is obtained from the Formula (1).

The surface roughness of catalytic layers (SRa) of the MEA is measured with a LASER microscope in the present invention. FIG. 3 shows an example of a roughness profile of a catalytic layer obtained with a LASER microscope. The LASER microscope employs an Ar ion LASER with a wavelength of 488 nm. The microscope scans within a rectangle area which has a ratio of 4:3 and is inscribed in a circle having a field number of 16 deflecting light with two galvanometer scanners. A circular pinhole, a z-revolver for a vertical movement, and an image rotator which can rotate a picture from −90° to 90° are adopted.

A scanning LASER microscope scans a sample in a x-direction and a y-direction focusing LASER beam within a microscopic point by an objective lens. Then, the microscope receives light from the sample's surface by the detector and shows an image of the sample on the monitor. In a confocal optics system, light from other than the focused focal point can be excluded by arranging a pinhole on the optical conjugate point to the focused focal point. Accordingly, such light appears deep dark in a picture and a sample having a bump or a step shape can be optically sliced so that a roughness profile of a catalytic layer surface is obtained.

In addition, it is a specific feature of the MEA of the present invention that the gloss value at 85° of the catalytic layer surface is in the 10-80% range. If the gloss value at 85° of the catalytic layer surface is more than 80%, gas diffusion and water diffusion decrease during power generation resulting in a fall of the battery performance. Meanwhile, if the gloss value at 85° of the catalytic layer surface is less than 10%, the battery performance in a low load region under a condition of low humidification drops because of a decrease of water retention capability of the catalytic layer. It is more preferable that the gloss value at 85° of the catalytic layer surface is in the 30-80% range (To be more specific, in the 50-80% range).

The gloss value at 85° of the catalytic layer of the present invention can be obtained on the basis of JIS (Japanese Industrial Standard) Z 8741 (1997) as a specular gloss at 85°.

It is a specific feature of the MEA of the present invention that the surface roughness of the catalytic layer (SRa) is in the 0.01-1.00 μm range and a gloss value at 85° (JIS Z 8741) of the catalytic layer surface is in the 10-80% range. It is more preferable that the surface roughness of the catalytic layer (SRa) is in the 0.05-0.40 μm range and the gloss value at 85° (JIS Z 8741) of the catalytic layer surface is in the 50-80% range.

It is only when both the surface roughness (SRa) and the gloss value at 85° of the catalytic layer surface are in the specific ranges that the MEA of the present invention can attain a sufficient water retention capability within the catalytic layer even under a low humidification condition so that a high level of battery performance is achieved.

It is necessary for the MEA of the present invention to have a surface roughness (SRa) of the catalytic layer in the 0.01-1.00 μm range. In order to make the surface roughness (SRa) of the catalytic layer in a predetermined range, dispersion performance of the catalyst loading particles in the catalyst ink must be considered. Specifically, the surface roughness (SRa) of the catalytic layer can be controlled by improving dispersion performance of particles in the catalytic layer by providing a sufficient dispersing treatment on the particles before the catalyst ink is coated on the base substrate.

It is preferable in the present invention that the catalyst ink receives a dispersion treatment using a planetary ball mill. The procedure of the dispersion treatment is as follows: The catalyst loading particles are preliminarily dispersed. Subsequently, a polymer electrolyte is added and a dispersing treatment is performed using a planetary ball mill to obtain a good dispersion state. The planetary ball mill disperses the material with zirconium beads of sub-micron or micron size by means of impact energies and shearing forces. By increasing rotational frequency of the ball mill, it is possible to significantly save treatment time (than, for example, in the case where a beads mill is used.).

The planetary ball mill of the present invention is comprised of a revolving main body of the mill and a rotating mill pot. The planetary ball mill of the present invention refers to an apparatus in which the objective material and grinding media such as zirconium ball are set in the rotating mill pot and which breaks the objective material in shatters by centrifugal forces generated by revolution of the main body and rotation of the mill pot. Meanwhile, the beads mill of the present invention means an apparatus in which grinding media such as zirconium balls are set in the cylindrical body, followed by adding the objective material and breaking it in shatters by rotating the body.

A dispersion treatment by a beads mill takes a significantly amount of time (which can be about 5-10 times longer than a dispersion treatment by a planetary ball mill in order to diffuse catalyst ink to a same degree). In addition, it is difficult to raise a recovery rate of the dispersion treatment by a beads mill because of difficulty of a collection of catalyst ink remaining in pore spaces between 0.5 mm of zirconium balls. Furthermore, it is also not easy to keep the zirconium balls clean.

In addition, a dispersion treatment using a homogenizer does not achieve a comparable effect with a dispersion treatment by a planetary ball mill in many cases. The manufacturing method of an MEA of the present invention makes it possible to prepare a well-dispersed catalyst ink in a short time by means of a planetary ball mill.

It is required in the MEA in the present invention that the gloss value at 85° (JIS Z 8741) of the catalytic layer is in the 10-80% range. In order to adjust the gloss value at 85° of the catalytic layer to a predetermined value, a transfer pressure and a transfer temperature in the transfer process must be carefully considered.

It is preferable that the transfer pressure in the transfer process is in the 20-200 kgf/cm$^2$ range. If the transfer pressure is lower than 20 kgf/cm$^2$, transfer defects are sometimes produced because of an insufficient transferability. Meanwhile, if the transfer pressure is more than 200 kgf/cm$^2$, it becomes hard to make the gloss value at 85° of the catalytic layer surface less than 80%.

In addition, it is preferable that the transfer temperature is in the 120-150° C. range. If the transfer temperature is lower than 120° C., transfer defects are sometimes produced because of an insufficient transferability. Meanwhile, if the transfer temperature is more than 150° C., it becomes hard to make the gloss value at 85° of the catalytic layer surface less than 80%.

The MEA and manufacturing thereof are described in detail below.

Only proton conductivity is required to the polymer electrolytes used in a MEA of the present invention. Fluorine series polymer electrolytes and hydrocarbon series polymer electrolytes can be used as a polymer electrolyte of the present invention. Nafion (registered trade mark) series materials made by Du Pont are examples of the fluorine series polymer electrolyte. Electrolyte membranes of sulfonated poly(ether ketones), sulfonated poly(ether sulfone), sulfonated poly(ether ether sulfone), sulfonated polysulfide and sulfonated polyphenylene etc. are examples of hydrocarbon series polymer electrolyte membrane. Among them, Nafion (registered trade mark) series material by Du Pont can be preferably used as a polymer electrolyte membrane Catalyst ink of the present invention contains at least catalyst loading particles, a polymer electrolyte and a solvent.

Metals of platinum group elements such as platinum, palladium, ruthenium, iridium, rhodium and osmium, other metals such as iron, lead, copper, chromium, cobalt, nickel, manganese, vanadium, molybdenum, gallium, aluminum, and further, alloys, oxides and multiple oxides etc. can be used as a catalyst of the catalyst loading particles. In particular, platinum and platinum alloy are desirable. The platinum and platinum alloy may contain tungsten, tin and/or rhenium etc. as additives. Such additives improve CO tolerance.

Carbon particles are preferably used as particles of catalyst loading particles. Any type of carbon particles are available as long as they are conductive particles and chemically-resistant to the catalyst. Carbon black, graphite, active carbon, carbon fiber, carbon nanotube and fullerene can be used. The diameter of the carbon particle is preferably in the 10-1000 nm range. Because there is a difficulty in forming an electric conductive path if particles are too small, while gas diffusion in the electrode catalytic layer becomes insufficient and/or catalyst efficiency decreases if particles are too large. To be more specific, the diameter of the carbon particle is preferred to be in the 10-100 nm range.

Any proton conductive polymer electrolyte can be used as a polymer electrolyte in the catalyst ink. Thus, the same polymer electrolyte as that of the polymer electrolyte membrane is also available. A fluorine series polymer electrolyte or a hydrocarbon series polymer electrolyte can be used. Nafion (registered trade mark) by Du Pont (E. I. du Pont de Nemours and Company), Flemion (registered trade mark) by Asahi Glass Co., Ltd., Aciplex (registered trade mark) by Asahi Kasei Corp., and Gore Select (registered trade mark) by W. L. Gore & Associates Inc. etc. can be used as the fluorine series polymer electrolyte. Electrolytes of sulfonated poly (ether ketone), sulfonated poly(ether sulfone), sulfonated poly(ether ether sulfone), sulfonated polysulfide or sulfonated polyphenylene etc. can be used as the hydrocarbon series polymer electrolyte. Considering a better adhesiveness between the catalytic layer and the polymer electrolyte membrane, it is desirable that an identical electrolyte material is used both in the catalytic layer and in the polymer electrolyte membrane.

A solvent is added in the catalyst ink so as to disperse catalyst loading particles and the polymer electrolyte. The solvent is preferred to include a volatile organic solvent which does not react with the catalyst loading particles and the polymer electrolyte. The solvent is selected considering a dispersion performance of the catalyst loading particles and the polymer electrolyte, and the amount of the solvent is determined considering a viscosity of the catalyst ink etc. Alcohols such as methanol, ethanol, 1-propanol, 2-propanol, 1-butanol, 2-butanol, isobutyl alcohol, tert-butyl alcohol, pentanol, 2-heptanol or benzyl alcohol etc., ketones such as acetone, methyl ethyl ketone, methyl propyl ketone, methyl butyl ketones, methyl isobutyl ketone, methyl amyl ketone, pentanone, heptanone, cyclohexanone, metyl cyclohexanone, acetonylacetone, diethyl ketone, dipropyl ketone or diisobutyl ketone, ethers such as tetrahydrofuran, tetrahydropyran, dioxane, diethyleneglycol dimethyl ether, anisole, methoxy toluene, diethyl ether, dipropyl ether and dibutyl ether, amines such as isopropyl amine, butyl amine, isobutyl amine, cyclohexyl amine, diethyl amine or aniline, esters such as propyl formate, isobutyl formate, amyl formate, methyl acetate, ethyl acetate, propyl acetate, butyl acetate, isobutyl acetate, pentyl acetate, isopentyl acetate, methyl propionate, ethyl propionate or butyl propionate, and other solvents such as acetic acid, propionic acid, dimethyl formamide, dimethyl acetamide, N-methyl pyrrolidone, ethylene glycol, diethylene glycol, propylene glycol, ethylene glycol monomethyl ether, ethylene glycol dimethyl ether, ethylene glycol diethyl ether, diacetone alcohol or 1-methoxy-2-propanol etc. are used as the solvent. In addition, water can be also used as the solvent. Moreover, the solvent may contain two or more of the solvents described above.

In addition, the catalyst ink may contain a dispersant to disperse the catalyst loading carbons. An anionic surfactant, cationic surfactant, a zwitterionic detergent, or nonionic surfactant can be used as the dispersant.

In addition, the catalyst ink may also contain a pore former. The pore former is an additive that is removed after the electrode catalytic layer is formed and helps to form pores in the electrode catalytic layer. A material which is soluble in water, acid or alkali, a sublimating material such as camphor, and a thermally decomposing material are examples of the pore former. If the pore former is soluble in water, it can be removed by water generated as a by-product of power generation.

Combined together and receiving a dispersing treatment, the polymer electrolyte, the catalyst loading particles and the solvent are made into the catalyst ink. The dispersing treatment is preferably performed as follows: First, the catalyst loading particles are pre dispersed in the solvent. Subsequently, the polymer electrolyte is added and dispersed by a planetary ball mill.

The base substrate, which is used as a transfer substrate in the present invention, needs to have good ink transferability. For example, fluorinated resins such as ETFE (ethylene-tetrafluoroethylene copolymer), EFP (tetrafluoroethylene-hexafluoropropylene copolymer), PFA (tetrafluoro ethylene-perfluoroalkyl vinyl ether copolymer) and PTFE (polytetrafluoroethylene) etc. can be used as the base substrate. In addition, polymer films such as polyimide, polyethylene terephthalate, polyamide (nylon), polysulfone, polyether sulfone, polyphenylene sulfide, polyether ether ketone, polyetherimide, polyarylate and polyethylene naphthalate can also be used.

In the manufacturing method of an MEA of the present invention, the catalyst ink that includes catalyst loading particles, the polymer electrolyte and the solvent is coated on a surface of the base substrate. A coating by a brush, a pen brush, a bar coater, a knife coater, and a die coater, screen printing, and spray painting etc. can be applied as the coating method of the catalyst ink. After the catalyst ink is coated on the base substrate, a drying process to remove the solvent in the catalyst ink is performed if necessary.

Next, A polymer electrolyte membrane is arranged between a couple of the base substrates facing both surfaces of the polymer electrolyte membrane with the surfaces of the base substrates on which the catalyst inks are coated. Then, the catalyst inks on the base substrates are transferred to the both surfaces of the polymer electrolyte membrane.

This transferring process is a process in which the catalyst inks coated on the base substrates are transferred to both sides of the electrolyte membrane so that the MEA is formed. It is possible to transfer the catalyst ink on the base substrate to the electrolyte membrane applying pressure and heat by means of hot forming apparatus. The transferring pressure is preferred to be in the 20-200 $kgf/cm^2$ range. If the transferring pressure is less than 20 $kgf/cm^2$, transferring defects caused by low ink transferability may appear. Meanwhile, if the transferring pressure is more than 200 $kgf/cm^2$, it becomes difficult to make the gloss value at 80° on the surface of the catalytic layer less than 80%. In addition, the transferring temperature is preferred to be in the 120-150° C. If the temperature is less than 120° C., transferring defects may be produced owing to insufficient ink transferability. Meanwhile, if the temperature is more than 150° C., it is sometimes difficult to make the gloss value at 80° on the surface of the catalytic layer less than 80%.

Finally, after the base substrates are removed, an MEA which has a catalytic layer on both sides of the polymer electrolyte is provided.

A fuel cell of the present invention will be described below.

Figure 4:
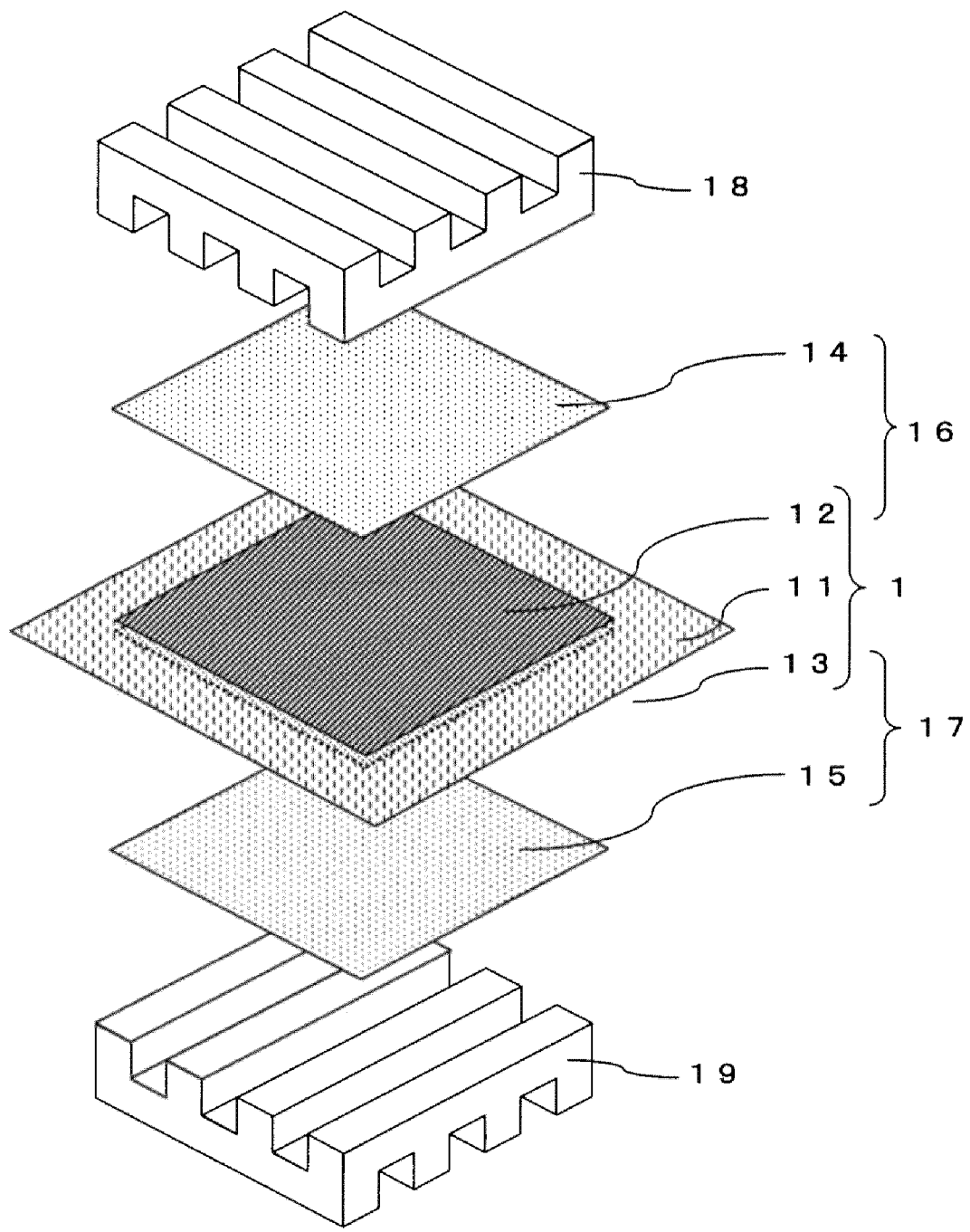
FIG. 4 illustrates an exemplary diagram of a disassembled polymer electrolyte fuel cell of the present invention.

FIG. 4 shows an exploded schematic diagram of the fuel cell of the present invention. A cathode gas diffusion layer 14 and an anode gas diffusion layer 15 are formed facing with the catalytic layer 12 and 13 of the MEA 1. The cathode gas diffusion layer together with the facing catalytic layer corresponds to a cathode electrode 16 and the anode gas diffusion layer together with the facing catalytic layer corresponds to an anode electrode 17. Then, a pair of separators 18 and 19 are placed further to the outside. Each of the separators made of a conductive and impermeable material has a gas flowing path on a surface and a cooling liquid sending path on the other surface as well.

Hydrogen, which is the fuel gas, is supplied by the gas flow path on the separator 19 of the anode, while air or oxygen gas is supplied by the gas flow path on the separator 18 of the cathode. Reacting hydrogen of the fuel gas with oxygen in the presence of the catalyst, an electromotive force is generated between the cathode and the anode.

Gas diffusion layers and separators that are used in conventional fuel cells can also be used in the present invention. Specifically, carbon cloth, carbon paper, and porous carbon nonwoven etc. can be used as the gas diffusion layer. Carbon separators and metal separators can be used as the separator. In addition, the fuel cell of the present invention can be fabricated by assembling the MEA and associated equipment such as gas supplying equipment and cooling equipment etc.

The fuel cell illustrated in FIG. 4 is a so-called "single cell", which has a pair of separators 18 and 19 together with a solid polymer electrolyte 11, electrode catalytic layers 12 and 13, and gas diffusion layers 14 and 15 therebetween. However, a fuel cell fabricated by stacking single cells is also included in the fuel cell of the present invention. In addition, the fuel cell of the present invention can be fabricated by assembling the MEA and associated equipment such as gas supplying equipment and cooling equipment etc.

EXAMPLES

Next, examples of the present invention will be described below. The present invention, however, is not limited to these examples.

Example 1

<Preparation of Catalyst Ink>

1.5 g of platinum loading carbons (45% by weight of Pt is loaded), 4 g of water and 6 g of 2-propanol were added to a 50 cc-pot made of zirconium of a planetary ball mill in the order of this description and mixed together. Then, a 200 rpm of pre-dispersion treatment was performed for 5 min. with the planetary ball mill. Subsequently, adding 3.5 g of 20% by weight of Nafion (a registered trademark and manufactured by Du Pont) solution and treating with the planetary ball mill at 700 rpm for 10 min., the catalyst ink was prepared. The diameter of the zirconium ball was 3 mm.

<Fabrication of Catalytic Layer and MEA>

The catalyst ink was coated by a die coater on a base substrate made of PFA (tetrafluoro ethylene-perfluoroalkyl vinyl ether copolymer) in such a way that the amount of loaded platinum was 0.3 mg/cm$^2$. After drying at 80° C. for 10 min., the catalytic layer was obtained. A sheet of 50 μm thick Nafion (a registered trademark and manufactured by Du Pont) was arranged between two catalytic layers on base substrates which are cut to a predetermined size. Then, forming with 100 kgf/cm$^2$ of transfer pressure at 130° C. for 10 min. by a pressure forming machine, the MEA was fabricated.

<Measurement of Surface Roughness (SRa)>

The surface of the catalytic layer of the MEA was measured by means of a LASER microscope "OLS1100 system" manufactured by Olympus Corp. The measurement was performed with an objective lens of 100 magnification (measuring area was 126 μm×252 μm), 90 in measured intensity, and 600 of measurement sensitivity. The SRa was calculated from the obtained roughness profile (3 dimensional) providing a luminance compensation and tilt corrections in x and y directions, respectively. As a result, the SRa was 0.18 μm.

<Measurement of Gloss Value at 85°>

The gloss value at 85° of the stripped plane of the catalytic layer after transferring was measured with a gloss meter manufactured by Byk-Gardner GmbH (Germany) according to JIS Z 8741 (1997). As a result, 55% was obtained as the gloss value.

<Battery Performance Evaluation>

The MEA was arranged between a pair of gas diffusion layers, a pair of separators made of carbon and a pair of current collectors made by titanium. Further arranging a heater on the exterior, a fuel cell with 5 cm$^2$ of effective area is fabricated. The fuel cell was kept under a temperature of 80° C. and low humidification condition, supplied with hydrogen gas of 40% RH in humidity to the anode with a flow rate of 200 cc/min. and air gas of 50% RH in humidity to the cathode with a flow rate of 800 cc/min. In addition, the back-pressure was 90 kPa at both electrodes. The voltage at 0.2 A/cm$^2$ of current density was measured and turned out to be 0.78 V.

Example 2

1.5 g of platinum loading carbons (45% by weight of Pt is loaded), 4 g of water, 6 g of 2-propanol and 3.5 g of 20% by weight of Nafion (a registered trademark and manufactured by Du Pont) solution received dispersion treatment with a beads mill dispersion machine for 1 hr. in preparation of the catalyst ink. Similar to example 1 except that zirconium beads with a diameter of 0.5 mm were used, the MEA was fabricated. The obtained MEA received the same measurements as example 1 (measurement of SRa (surface roughness), measurement of gloss value at 85° and battery performance evaluation).

Example 3

The MEA was fabricated in the same way as example 1 except that zirconium ball of 1 mm diameter was used in the planetary ball mill treatment in preparation of the catalyst ink.

Example 4

The MEA was fabricated in the same way as in the case of example 1 except that zirconium ball of 0.5 mm diameter was used in the planetary ball mill treatment in preparation of the catalyst ink.

Example 5

The MEA was fabricated in the same way as in the case of example 1 except that zirconium balls of 0.5 mm diameter and 3 mm diameter were used in the planetary ball mill treatment in preparation of the catalyst ink.

Example 6

The MEA was fabricated in the same way as in the case of example 5 except that the transfer temperature was 140° C. in the transfer process in forming the catalytic layer.

Comparative Example 1

The MEA was fabricated in the same way as in the case of example 1 except that the catalyst ink was prepared treating by a 700 rpm of homogenizer for 20 min. after 1.5 g of platinum loading carbons (45% by weight of Pt is loaded), 4 g of water and 6 g of 2-propanol were mixed and a 200 rpm of pre-dispersion treatment by means of a homogenizer was performed for 5 min. followed by adding 3.5 g of 20% by weight of Nafion solution. The obtained MEA received the same measurements as that in example 1 (measurement of SRa (surface roughness), measurement of gloss value at 85° and battery performance evaluation).

Comparative Example 2

The MEA was fabricated in the same way as in the case of example 1 except that the transfer pressure was 20 kgf/cm$^2$ in the transfer process.

Comparative Example 3

The MEA was fabricated in the same way as in the case of example 1 except that the transfer pressure was 400 kgf/cm$^2$ in the transfer process. The same measurements as in the case of example 1 (measurement of SRa (surface roughness), measurement of gloss value at 85° and battery performance evaluation) were performed on the obtained MEA.

Comparative Example 4

The MEA was fabricated in the same way as in the case of comparative example 3 except that the transfer temperature was 180° C. in the transfer process. The same measurements as in the case of example 1 (measurement of SRa (surface roughness), measurement of gloss value at 85° and battery performance evaluation) were performed on the obtained MEA.

Comparative Example 5

The MEA was fabricated in the same way as in the case of comparative example 1 except that the catalyst ink was prepared treating by a 10000 rpm of homogenizer for 20 min. after 1.5 g of platinum loading carbons (45% by weight of Pt is loaded), 4 g of water and 6 g of 2-propanol were mixed and a 200 rpm of pre-dispersion treatment by means of a homogenizer was performed for 5 min. followed by adding 3.5 g of 20% by weight of Nafion solution. The obtained MEA received the same measurements as that in example 1 (measurement of SRa (surface roughness), measurement of gloss value at 85° and battery performance evaluation).

Table 1B shows experimental results on SRa, gloss value and battery performance of examples and comparative examples.

TABLE 1A

| | Dispersion condition | | |
|---|---|---|---|
| | Dispersing apparatus | Revolution speed (rpm) | Treating time (min.) | Diameter of the ball (mm) |
| Example 1 | Planetary ball mill | 700 | 10 | 3 |
| Example 2 | Beads mill | — | 60 | 0.5 |
| Example 3 | Planetary ball mill | 700 | 10 | 1 |
| Example 4 | Planetary ball mill | 700 | 10 | 0.5 |
| Example 5 | Planetary ball mill | 700 | 10 | 3 + 0.5 |
| Example 6 | Planetary ball mill | 700 | 10 | 3 + 0.5 |
| Comparative example 1 | Homogenizer | 700 | 20 | — |
| Comparative example 2 | Planetary ball mill | 700 | 10 | 3 |
| Comparative example 3 | Planetary ball mill | 700 | 10 | 3 |
| Comparative example 4 | Planetary ball mill | 700 | 10 | 3 |
| Comparative example 5 | Homogenizer | 700 + 10000 | 20 + 20 | — |

TABLE 1B

| | Transfer condition | | | | | |
|---|---|---|---|---|---|---|
| | Temperature (° C.) | Time (min.) | Pressure (kgf/cm²) | SRa (µm) | Gloss at 85° (%) | Battery Performance (V) |
| Example 1 | 130 | 10 | 100 | 0.18 | 55 | 0.78 |
| Example 2 | 130 | 10 | 100 | 0.19 | 59 | 0.77 |
| Example 3 | 130 | 10 | 100 | 0.11 | 59 | 0.77 |
| Example 4 | 130 | 10 | 100 | 0.08 | 67 | 0.79 |
| Example 5 | 130 | 10 | 100 | 0.07 | 71 | 0.80 |
| Example 6 | 140 | 10 | 100 | 0.06 | 75 | 0.79 |
| Comparative example 1 | 130 | 10 | 100 | 1.50 | 20 | 0.69 |
| Comparative example 2 | 130 | 10 | 10 | — | — | — |
| Comparative example 3 | 130 | 10 | 400 | 0.16 | 90 | 0.62 |
| Comparative example 4 | 180 | 10 | 400 | 0.02 | 93 | 0.41 |
| Comparative example 5 | 130 | 10 | 100 | 1.20 | 35 | 0.72 |

The dispersing treatment was carried out using a beads mill in example 2. The SRa was 0.19 µm and the gloss value at 85° was 59%. The voltage at 0.2 A/cm² of current density was 0.77 V, which corresponds to a battery performance comparable to that in example 1. It is a disadvantage, however, that the treatment time for dispersion was long, which indicates a low productivity.

The dispersing treatment of catalyst ink by a planetary ball mill was carried out using 1 mm of zirconium balls in example 3. The SRa was 0.11 µm and the gloss value at 85° was 59%. The voltage at 0.2 A/cm² of current density was 0.77 V, which corresponds to a battery performance comparable to that in example 1.

The dispersing treatment of catalyst ink by a planetary ball mill was carried out using 0.5 mm of zirconium balls in example 4. The SRa was 0.08 µm and the gloss value at 85° was 67%. The voltage at 0.2 A/cm² of current density was 0.79 V, which corresponds to a battery performance comparable to that in example 1.

The dispersing treatment of catalyst ink by a planetary ball mill was carried out using 0.5 mm and 3 mm of zirconium balls mixed together in example 5. The SRa was 0.07 µm and the gloss value at 85° was 71%. The voltage at 0.2 A/cm² of current density was 0.80 V, which corresponds to a battery performance comparable to that in example 1.

The dispersing treatment of catalyst ink by a planetary ball mill was carried out using 0.5 mm and 3 mm of zirconium balls mixed together and the transfer temperature was set to 140° C. in example 6. The SRa was 0.06 µm and the gloss value at 85° was 75%. The voltage at 0.2 A/cm² of current density was 0.79 V, which corresponds to a battery performance comparable to that in example 1.

The dispersing treatment was carried out using a homogenizer in comparative example 1. The SRa was as high as 1.5 µm and the gloss value was 20% because of the low dispersion performance of the catalyst ink. The voltage at 0.2 A/cm² of current density was 0.69 V, which is lower than that in example 1.

The MEA was not obtained in comparative example 2 since there was a fault in transfer when the catalytic layer was attached to the electrolyte membrane. Thus, the SRa, the gloss value and the battery performance were not measured.

The SRa was 0.16 µm and the gloss value was 90% in comparative example 3. The voltage at 0.2 A/cm² of current density was 0.62 V, which is lower than that in example 1. It seemed that the catalytic layer was crushed because of a high transfer pressure of 400 kgf/cm².

The SRa was 0.02 µm and the gloss value was 93% in comparative example 4. The voltage at 0.2 A/cm² of current density was 0.41 V, which is lower than that in example 1. It seemed that the catalytic layer was severely crushed because of a high transfer pressure of 400 kgf/cm² and a high transfer temperature of 180° C.

The dispersing treatment was carefully performed using a homogenizer in comparative example 5. The SRa was as high as 1.20 µm and the gloss value was 35% because of the low dispersion performance of the catalyst ink. The voltage at 0.2 A/cm² of current density was 0.72 V, which is lower than that in example 1.

As described above in example 1 to example 6, it was confirmed that MEAs having good battery performance at a low load point such as 0.2 A/cm² of current density under low humidification condition can be provided.

What is claimed is:

1. A manufacturing method of a membrane electrode assembly which has catalytic layers on both surfaces of a polymer electrolyte membrane, the method comprising:

coating a catalyst ink, which contains catalyst loading particles, a polymer electrolyte and a solvent, on a single surface of each of two base substrates;

arranging a polymer electrolyte membrane between said two base substrates in such a way that each of said base substrate's surfaces on which said catalyst ink is coated faces said polymer electrolyte membrane;

transferring said catalyst ink coated on said two base substrates to both surfaces of said polymer electrolyte membrane to form said catalytic layers; and peeling said two base substrates, which are attached to both sides of said polymer electrolyte membrane via said catalytic layers, off from said polymer electrolyte membrane and said catalytic layers, each surface roughness (SRa) of said catalytic layers formed on said polymer electrolyte membrane after said peeling process being in the 0.01-1.00 μm range, each gloss value at 85° (cf. JIS (Japanese Industrial Standard) Z 8741) of a surface of said catalytic layers being in the 10-80% range.

2. The manufacturing method in accordance with claim 1, further comprising preparing said catalyst ink to receive a dispersion treatment using a planetary ball mill.

3. The manufacturing method in accordance with claim 1, comprising transferring said catalyst ink coated on said base substrates to both surfaces of said polymer electrolyte membrane with a transfer pressure in the 20-200 kgf/cm$^2$ range.

4. The manufacturing method in accordance with claim 1, comprising transferring said catalyst ink coated on said base substrates to the both surfaces of said polymer electrolyte membrane at a transfer temperature in the 120-150° C.

5. The manufacturing method in accordance with claim 1, wherein said surface roughness of said catalytic layers on said polymer electrolyte after said base substrates are peeled off (SRa) is in the 0.05-0.40 μm range, and said gloss value at 85° (cf. JIS (Japanese Industrial Standard) Z 8741) of a surface of said catalytic layer is in the 50-80% range.

6. A membrane electrode assembly which is produced by said manufacturing method in accordance with claim 1.

7. A membrane electrode assembly which is produced by said manufacturing method in accordance with claim 2.

8. A membrane electrode assembly which is produced by said manufacturing method in accordance with claim 3.

9. A membrane electrode assembly which is produced by said manufacturing method in accordance with claim 4.

10. A membrane electrode assembly which is produced by said manufacturing method in accordance with claim 5.

11. A membrane electrode assembly comprising:
a pair of catalytic layers; and
a polymer electrolyte membrane, said polymer electrolyte membrane being arranged between said pair of catalytic layers, said catalytic layers including catalyst loading particles and a polymer electrolyte, the surface roughness of said catalytic layers (SRa) being in the 0.01-1.00 μm range, and the gloss value at 85° (cf. JIS (Japanese Industrial Standard) Z 8741) of a surface of said catalytic layers being in the 10-80% range.

12. The membrane electrode assembly in accordance with claim 11, wherein said surface roughness of said catalytic layers (SRa) is in the 0.05-0.40 μm range, and the gloss value at 85° (cf. JIS (Japanese Industrial Standard) Z 8741) of a surface of said catalytic layers is in the 50-80% range.

13. A fuel cell comprising:
a pair of separators;
a pair of gas diffusion layers; and
the membrane electrode assembly in accordance with claim 6, wherein said membrane electrode assembly is arranged between said pair of gas diffusion layers, and said pair of gas diffusion layers combined together with said membrane electrode assembly is arranged between said pair of separators.

14. A fuel cell comprising:
a pair of separators;
a pair of gas diffusion layers; and
the membrane electrode assembly in accordance with claim 7, wherein said membrane electrode assembly is arranged between said pair of gas diffusion layers, and said pair of gas diffusion layers combined together with said membrane electrode assembly is arranged between said pair of separators.

15. A fuel cell comprising:
a pair of separators;
a pair of gas diffusion layers; and
the membrane electrode assembly in accordance with claim 8, wherein said membrane electrode assembly is arranged between said pair of gas diffusion layers, and said pair of gas diffusion layers combined together with said membrane electrode assembly is arranged between said pair of separators.

16. A fuel cell comprising:
a pair of separators;
a pair of gas diffusion layers; and
the membrane electrode assembly in accordance with claim 9, wherein said membrane electrode assembly is arranged between said pair of gas diffusion layers, and said pair of gas diffusion layers combined together with said membrane electrode assembly is arranged between said pair of separators.

17. A fuel cell comprising:
a pair of separators;
a pair of gas diffusion layers; and
the membrane electrode assembly in accordance with claim 10, wherein said membrane electrode assembly is arranged between said pair of gas diffusion layers, and said pair of gas diffusion layers combined together with said membrane electrode assembly is arranged between said pair of separators.

18. A polymer electrolyte fuel cell comprising:
a pair of separators;
a pair of gas diffusion layers; and
the membrane electrode assembly in accordance with claim 11, wherein said membrane electrode assembly is arranged between said pair of gas diffusion layers, and said pair of gas diffusion layers combined together with said membrane electrode assembly is arranged between said pair of separators.

19. A polymer electrolyte fuel cell comprising:
a pair of separators;
a pair of gas diffusion layers; and
the membrane electrode assembly in accordance with claim 12, wherein said membrane electrode assembly is arranged between said pair of gas diffusion layers, and said pair of gas diffusion layers combined together with said membrane electrode assembly is arranged between said pair of separators.

* * * * *